March 25, 1958     H. D. BRAILSFORD     2,828,483
INDICATOR COUPLING APPARATUS
Original Filed April 24, 1953
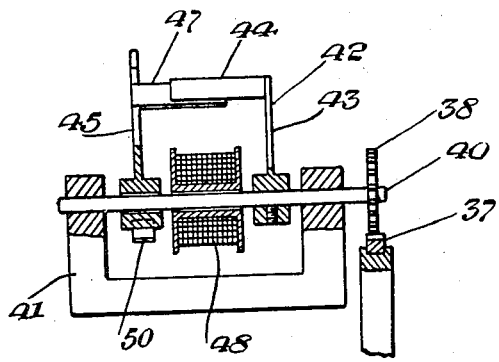
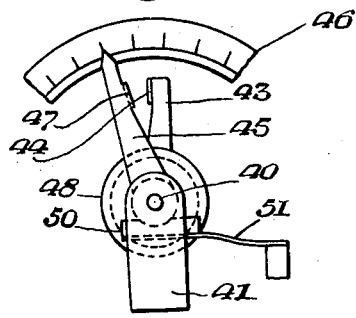
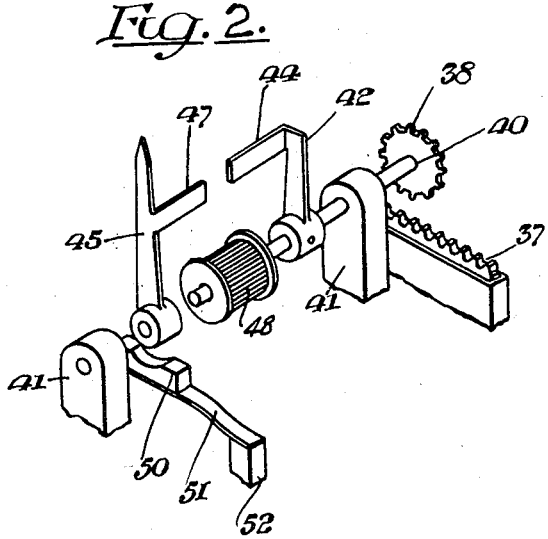
INVENTOR.
Harrison D. Brailsford
BY
ATTORNEY 2,828,483

Patented Mar. 25, 1958

2,828,483
INDICATOR COUPLING APPARATUS

Harrison D. Brailsford, Rye, N. Y.

Original application April 24, 1953, Serial No. 350,854, now Patent No. 2,769,339, dated November 6, 1956. Divided and this application September 12, 1956, Serial No. 609,499

2 Claims. (Cl. 340—378)

This invention relates to an indicator and coupling apparatus for indicating or recording information such as test data and the like. The present application is a division of my co-pending application Serial #350,854, now Patent #2,769,339, entitled Relative Humidity Indicating and Recording Apparatus.

In the aforesaid Patent #2,769,339, I have disclosed and claimed apparatus for indicating and recording relative humidity based on a principle of sampling air or other gas containing water vapor, which sample is compressed to a point where saturation occurs, suitable means being provided to prevent adiabatic heating. In accordance with such apparatus there is a moving cylinder. It is necessary that the point at which saturation occurs be indicated accurately. One of the problems is to provide such indicating apparatus which will not be deleteriously affected by continued movement of the apparatus, such as the piston in the above described system, caused by factors such as for instance inertia.

Accordingly, it is an object of this invention to provide a coupling and indicating apparatus for indicating certain measurements accurately without being affected by inertial or other continued movement of parts connected thereto.

Other objects will be apparent after consideration of the following description and drawings in which, Figure 1 is a side elevation view, partly in section, of the indicating and coupling apparatus in accordance herewith;

Figure 2 is an exploded perspective view of the indicator and coupling apparatus; and Figure 3 is an end elevation view of the apparatus.

In accordance with this invention, an indicator and scale is provided, which indicator is coupled through suitable means to the test apparatus providing the measurement. The coupling means follow accurately the movements of the test apparatus, but additional electrical control is provided whereby the pointer of the indicator stops instantly when the desired test measurement point is reached, although other mechanical parts of the system may continue movement due to, as mentioned previously, factors such as inertia. In accordance herewith the pointer is coupled through magnetic means with electrical parts for controlling the magnetic force creating such coupling.

Referring now more specifically to the drawings, a rack 37 is fixed or connected by any suitable means to the moving member of the test apparatus, the position of which at a given moment is desired to be indicated. The rack 37 engages, by suitable gear means, a pinion 38 mounted on the end of a shaft 40. The shaft 40 is mounted for rotation in a suitable bracket 41, the bracket having the usual bushings in its upturned arms. Within the mounting brackets 41 there is a first member 42 mounted on the shaft 40 for rotation therewith and comprising a radially extending arm 43 and an axially extending lug 44. All parts of this member 42 are made of magnetic material such as soft iron or the like.

Also mounted on the shaft 40 and for rotation therebout, is an indicating arm or pointer 45. A suitable scale 46 is positioned in the usual way for indicating cooperation therewith. An axially extending lug 47 extends from the pointer 45 toward and beyond the complementary extending lug 44 on the other member 42, so that when mounted the two extending lugs 44 and 47 are positioned in parallel relationship, adjacent to each other. All parts of the indicator arm and its lug 47 similarly are made of magnetic material such as soft iron or the like.

Between the member 42 and the pointer 45, is an electro-magnetic coil 48 loosely mounted on and about the shaft 40. This magnetic coil is of any usual type for imparting, because of electrical current therein, magnetic force in and about the iron parts associated therewith. Thus electrical current through the coil 48 creates a magnetic circuit or path through the shaft 40, the arm 42, the lugs 44 and 47, and the pointer 45, with the two lugs 44 and 47 thus constituting magnetic pole pieces.

Preferably there is also provided a suitable braking means comprising a brakeshoe 50 mounted so as to press against the hub portion of the pointer 45 by means of a suitable leaf spring 51. This spring 51 may be mounted in any desired and suitable manner upon a fixed portion such as 52 of the measurement apparatus.

In the aforementioned Patent 2,769,339, an electrical circuit is provided, controlled by a relay which in turn is operated by virtue of a photoelectric cell responding to moisture forming on a mirror-like reflected surface. Such a circuit is indicative or exemplary of the type electrical control which may be provided, as will be apparent to one skilled in the art. Other circuits of like nature may be connected to the magnetic coil 48 to make and break the electrical circuit for energization and de-energization thereof at desired moments. The electrical circuit energizing the coil 48 thus creating the magnetic path, as described above, may be broken when the point desired to be measured is reached, thus de-energizing the coil.

Accordingly, in operation, energization of the coil 48 continues while a measurement is taking place. Movement of the rack 37 causes the arm 42 with its lug 44 to rotate and due to the magnetic attraction between lug 44 and 47 the pointer 45 rotates therewith. When the point desired to be measured is reached and de-energization of the coil 48 occurs, the magnetic attraction is broken and pointer 45 ceases its rotation. For this purpose the brakeshoe 50 may be suitably adjusted so as to pose the pointer 45 to rotate under the influence of the magnetic attraction and yet stop immediately when such magnetic attraction no longer exists. Thus an accurate indication is made of the point desired to be measured, although there may be continued movement of mechanical parts. The rack 37, by such continued inertial movement, will not affect the precision of the indication of the measurement being taken.

Measurements to be taken are in the direction in which the pointer 45 moves as a result of the magnetic attraction as described above. In resetting the pointer 45 to the zero indication on the scale 46, the movement of the arm 42 in the opposite direction will cause the lug 44, physically or mechanically, to contact the lug 47 thus urging the pointer 45 in that direction.

While preferred embodiments of the invention have been illustrated and described, it will be apparent to those skilled in the art that modifications may be made within the scope thereof as defined in the following claims.

What is claimed is:

1. In a combined indicator and coupling device, in combination, a driven shaft, an arm mounted on and secured to said shaft, said arm having an extension parallel to said shaft, a second arm mounted on said shaft and being freely rotatable thereon, said second arm having an extension parallel with said shaft and lying in the path of said first extension, a scale cooperating with said second arm, and electromagnetic means operationally periodically energizable for establishing a magnetic circuit through shaft, said arms and said extensions whereby movement of said shaft and said first arm in one direction causes said indicator arm to move over the scale when said electromagnetic means is energized due to the magnetic attraction between the said extensions and movement of the shaft in the opposite direction causes like conjoint movement due to physical contact between said arm extensions.

2. A device as claimed in claim 1, characterized in that said electromagnetic means comprises a coil wound upon a core loosely positioned on said shaft between said arms.

References Cited in the file of this patent

UNITED STATES PATENTS 2,417,339     Woolley  --------------- Mar. 11, 1947